United States Patent
Weng

(10) Patent No.: US 6,512,820 B1
(45) Date of Patent: Jan. 28, 2003

(54) DISTANT REMOTE-CONTROL DEVICE OF ELECTRIC APPLIANCE

(75) Inventor: Linsong Weng, No. 33, Alley 27, Lane 755, Fu-Hsing Rd., Chu-Pei (TW)

(73) Assignees: Hugewin Electronics Co., Ltd., Chu-Pei (TW); Linsong Weng, Chu-Pei (TW)

( * ) Notice: Subject to any disclaimer, the term of this patent is extended or adjusted under 35 U.S.C. 154(b) by 0 days.

(21) Appl. No.: 09/960,990

(22) Filed: Sep. 25, 2001

(51) Int. Cl.$^7$ .............................................. H04M 11/00
(52) U.S. Cl. .............................. 379/102.05; 379/102.01
(58) Field of Search ..................... 379/102.01–102.05, 379/102.07

(56) References Cited

U.S. PATENT DOCUMENTS

| | | | | | |
|---|---|---|---|---|---|
| 4,885,766 A | * | 12/1989 | Yasuoka et al. | ....... | 379/102.03 |
| 5,386,461 A | * | 1/1995 | Gedney | ................ | 379/102.05 |
| 5,838,776 A | * | 11/1998 | Adkins, II et al. | ...... | 379/102.05 |
| 6,260,765 B1 | * | 7/2001 | Natale et al. | .......... | 379/102.05 |

* cited by examiner

*Primary Examiner*—Wing Chan
(74) *Attorney, Agent, or Firm*—Rosenberg, Klein & Lee

(57) ABSTRACT

The present invention provides a distant remote-control device of electric appliance, wherein an infrared signal of an electric appliance to be remotely controlled is learnt using a signal converter, and a corresponding address serial code is provided so that telephone tones can be matched for maneuvering a telephone remote-control mainframe and the signal converter can be used to convert signals for remotely controlling electric appliances remotely controlled by infrared rays. Wireless remote-control electric appliances originally designed according to the present invention can also be remotely controlled in wireless way simultaneously. The present invention directly learns remote-control signals of electric appliances to achieve distant remote control of electric appliances using a telephone. The present invention also has the advantages of simple operation and convenient use.

17 Claims, 5 Drawing Sheets

DISTANT REMOTE-CONTROL DEVICE OF ELECTRIC APPLIANCE

FIELD OF THE INVENTION

The present invention relates to a distant remote-control device and, more particularly, to a distant remote-control device of electric appliance utilizing the characteristic of infrared remote-control signals capable of learning mutually.

BACKGROUND OF THE INVENTION

Along with continual progress of scientific technology, the level of human lives becomes higher and higher. More people tend to pursue convenience and agility in lives. Therefore, wireless remote-control way has been applied to electric appliances such as televisions, electric fans, hi-fi equipments, and air-conditioners in everyday lives, hence automating present families.

Generally speaking, using a telephone to remotely control electric appliances has been a widely accepted method. In a conventional system, an indoor telephone line is directly matched with a distant remote-control device, which is connected to an electric appliance to be remotely controlled via an electric wire. A telephone is then used for distant remote control of the electric appliance indoors. Because commonly used electric appliances are remotely controlled directly using infrared rays, this kind of remote-control devices cannot utilize infrared rays for remote control. It is necessary to connect a power connector of the electric appliance to be remotely controlled using an electric wire or to modify the internal wiring of a remote controller thereof, hence resulting in much inconvenience.

Because the distant remote-control device is connected to an electric appliance to be remote-controlled via an electric wire in the prior art, it is necessary to attach an electric wire on each electric appliance, or the internal circuit of each electric appliance needs to be redesigned or modified, hence wasting much time and money. Moreover, this procedure is cumbersome so that it cannot be set by a user himself and must be installed by the dealer, resulting in much inconvenience in practice.

Accordingly, the present invention aims to propose a distant remote-control device of electric appliance to learn remote-control signals of electric appliances and then to remotely control them using a telephone.

SUMMARY OF THE INVENTION

The primary object of the present invention is to propose a distant remote-control device of electric appliance utilizing the characteristic of infrared remote-control signals capable of learning mutually to directly learn remote-control signals of electric appliances, thereby achieving remote control of electric appliances using a telephone without attaching electric wires on electric appliances or modifying internal circuits thereof.

Another object of the present invention is to propose a distant remote-control device of electric appliance with an inbuilt code-discriminating device to provide discrimination of code for a user, hence securing safety of use of the distant remote-control device.

Yet another object of the present invention is to propose a distant remote-control device of electric appliance of simple operation and convenient use.

To achieve the above objects, the present invention comprises a telephone remote-control mainframe, and a signal converter. The telephone remote-control mainframe is connected with a telephone line to provide distant remote control for a user using telephone tones. The signal converter first learns and stores infrared remote-control signals of an electric appliance such as an air-conditioner/heater, and correspondingly obtains a digital address serial code. On the other hand, a switch of a wireless remote-control gas oven is controlled using a special controller, which also has a corresponding address serial code. The telephone remote-control mainframe emits different control signals to individually maneuver the signal converter and the special controller, thereby letting the signal converter convert the control signals into corresponding infrared remote-control signals to control the action of the air-conditioner/heater and letting the special controller directly receive the control signals to control the switch of the gas oven. Next, the air-conditioner/heater emits a sensing signal to the telephone remote-control mainframe via a sensing-signal emitter, and the special controller also emits an acknowledge signal to the telephone remote-control mainframe to inform the user that the instructions have been finished.

The various objects and advantages of the present invention will be more readily understood from the following detailed description when read in conjunction with the appended drawing, in which:

DETAILED DESCRIPTION OF THE PREFERRED EMBODIMENTS

The present invention utilizes the principle that infrared remote-control signals of general electric appliances can be learnt mutually to propose a distant remote-control device of electric appliance. Infrared signals of an electric appliance to be remotely controlled are learnt, and a corresponding address serial code is provided so that telephone tones can be matched for remotely controlling electric appliances remotely controlled by infrared rays. Wireless remote-control electric appliances originally designed according to the present invention can also be remotely controlled in wireless way simultaneously.

Figure 1:
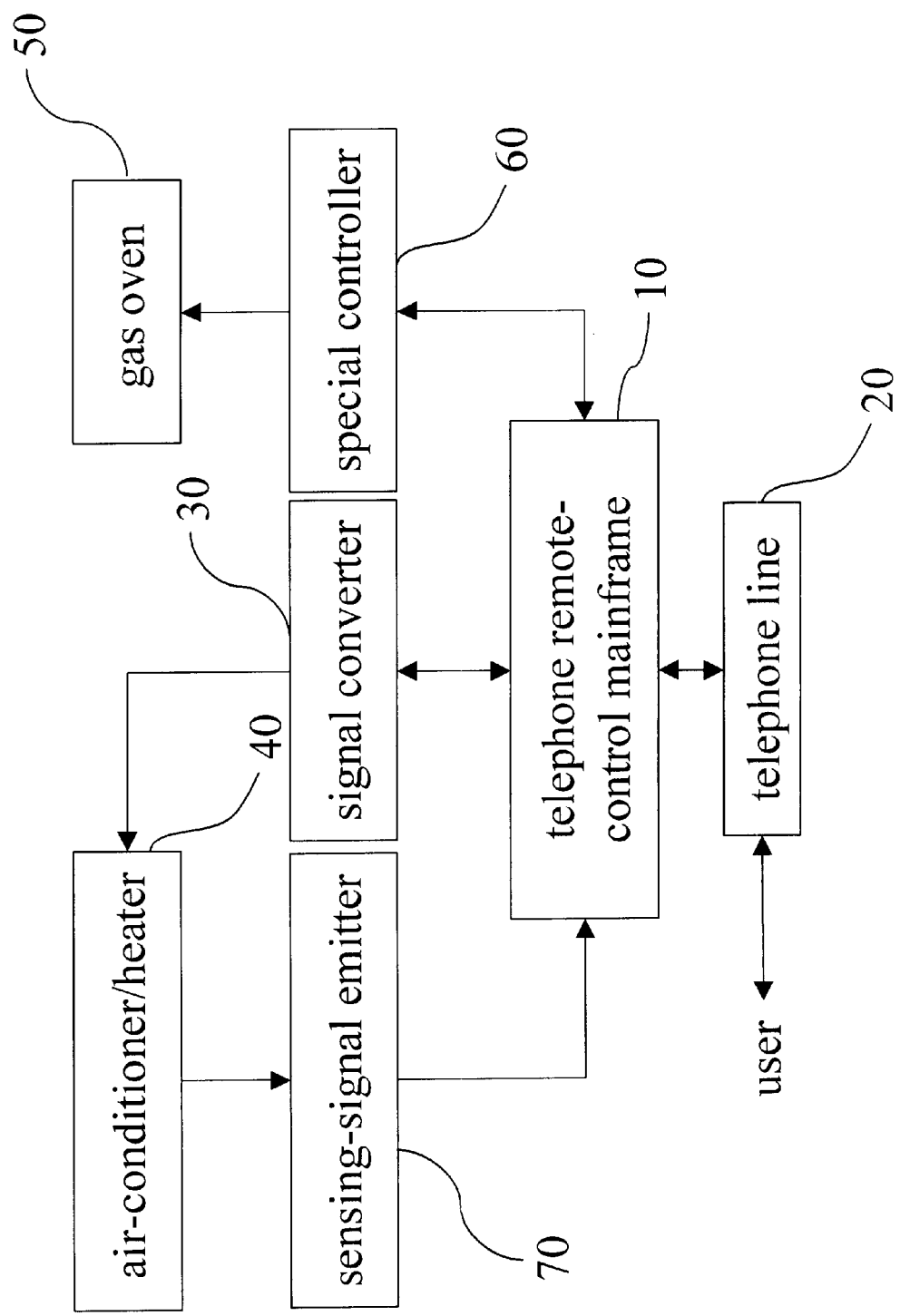
FIG. 1 is a structure diagram of the present invention.

As shown in FIG. 1, a distant remote-control device of electric appliance comprises a telephone remote-control mainframe 10 and a signal converter 30. The telephone remote-control mainframe 10 is connected with a telephone line 30 to provide distant remote control for a user using telephone tones. The signal converter 30 first learns and stores infrared remote-control signals of an electric appliance such as an air-conditioner/heater 40, and correspondingly encodes the learnt infrared remote-control signals to obtain a digital address serial code in wireless/infrared remote-control encoding way. On the other hand, a switch of a wireless remote-control gas oven 50 is controlled using a special controller 60, which also has a corresponding address serial code. The telephone remote-control mainframe 10 is used to set the address serial codes of the air-conditioner/heater 40 and the special controller 60 in the signal converter 30. The telephone remote-control mainframe 10 emits different control signals to individually maneuver the signal converter 30 and the special controller 60 using different and independent address serial codes, thereby letting the signal converter 30 convert the control signals into corresponding infrared remote-control signals to control the action of the air-conditioner/heater 40 and letting the special controller 60 directly receive the control signals to control the switch of the gas oven 50. The air-conditioner/heater 40 has a sensing-signal emitter 70. When the air-conditioner/heater 40 receives the infrared remote-control signal to start operating, the sensing-signal emitter 70 senses variation generated by the air-conditioner/heater 40 due to practical operation to emits a sensing signal to the telephone remote-control mainframe 10, thereby informing a distant user the air-conditioner/heater 40 has started operating normally. Additionally, after the special controller 60 receives a control signal to close the gas oven 50, it emits an acknowledge signal to the telephone remote-control mainframe 10, thereby informing the user that the gas oven 50 has finished the instructions.

Figure 2:
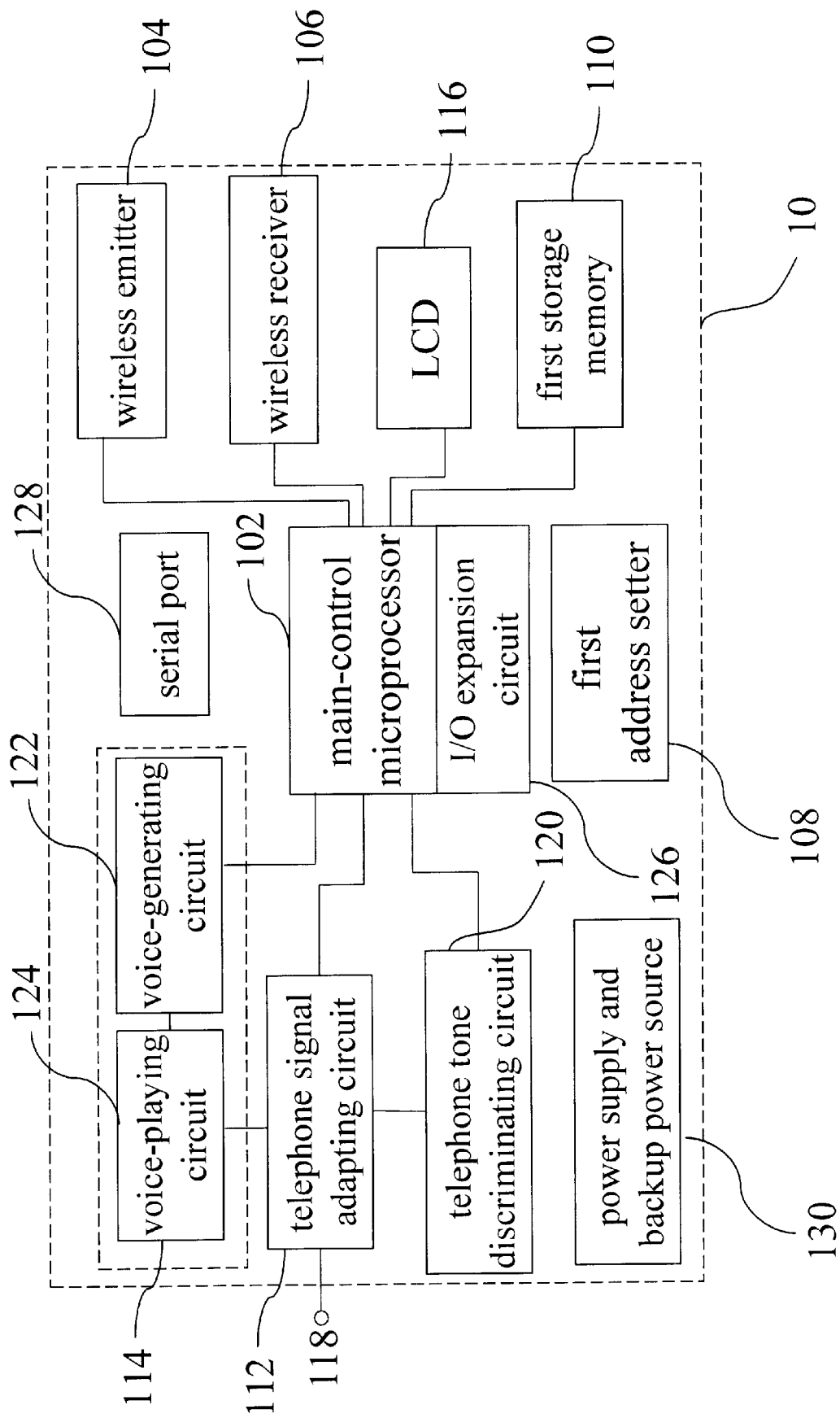
FIG. 2 is a structure diagram of a telephone remote-control mainframe of the present invention.

As shown in FIG. 2, the telephone remote-control mainframe 10 comprises a main-control microprocessor 102 connected with a wireless emitter 104, a wireless receiver 106, a first address setter 108, a first storage memory 110, a telephone signal adapting circuit 112, a voice device 114, and a liquid crystal display 116. The main-control microprocessor 102 receives an address serial code inputted by the first address setter 108, displays it on the liquid crystal display 116 simultaneously, and stores the data into the first storage memory 110. The first storage memory 110 is generally a flash memory. The wireless receiver 106 receives and learns other different digital address serial codes. The telephone signal adapting circuit is connected to a telephone circuit 118. A telephone tone discriminating circuit 120 is connected between the telephone signal adapting circuit 112 and the main-control microprocessor 102 to provide discrimination of code for the user, thereby securing safety of use of the remote-control device. When a user enters into the telephone remote-control mainframe 10 via the telephone circuit 118, the voice device 114 comprising a voice-generating circuit 122 and a voice-playing circuit 124 can provide voice indication for him, hence achieving simple operation. After the telephone tone signal received by the telephone signal adapting circuit 112 is successfully compared and discriminated by the telephone tone discriminating circuit 120, the telephone signal adapting circuit 112 connected to the telephone circuit 118 transfers the signal to the main-control microprocessor 102, which then sends out a control signal to be emitted out via the wireless emitter 104.

The main-control microprocessor 102 comprises an I/O expansion circuit 126 to provide sufficient I/O contacts for connecting other devices. The main-control microprocessor 102 also has a serial port 128, which is used to connect other external digital systems. In addition to an original power supply, the telephone remote-control mainframe 10 also has an inbuilt backup DC power supply to form a power supply and backup power source 130, which can provide electricity for temporary normal operation when a blackout occurs.

Figure 3:
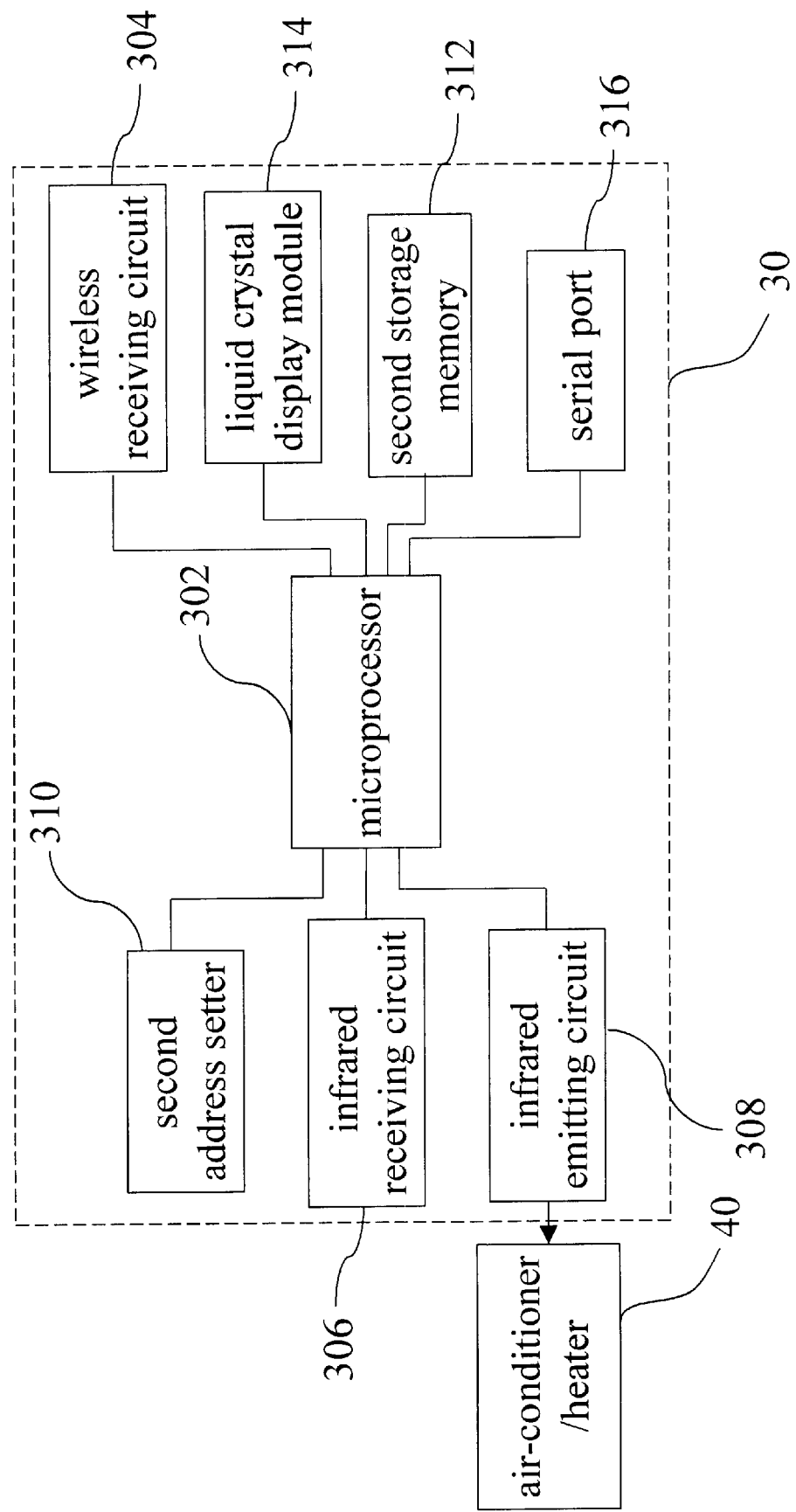
FIG. 3 is a structure diagram of a signal converter of the present invention.

As shown in FIG. 3, the signal converter 30 comprises a microprocessor 302 connected with a wireless receiving circuit 304, an infrared receiving circuit 306, an infrared emitting circuit 308, a second address setter 310, a second storage memory 312, and a liquid crystal display module 314. The microprocessor 302 utilizes the infrared receiving circuit 306 to learn and receive an infrared remote-control signal of an electric appliance such as the air-conditioner/heater 40, and correspondingly encode the learnt infrared remote-control signal to obtain a digital address serial code in wireless/infrared remote-control encoding way. The second address setter 310 sets the corresponding address serial code of the air-conditioner/heater 40, displays it on the liquid crystal display module 314 simultaneously, and stores the data into the second storage memory 312. When the wireless receiving circuit 304 receives a wireless control signal emitted by the telephone remote-control mainframe 10, the wireless receiving circuit 304 first transfers the signal to the microprocessor 302 to convert it into a corresponding infrared remote-control signal, which is then emitted out by the infrared emitting circuit 308, thereby remotely controlling a switch of the air-conditioner/heater 40. The signal converter 30 further has a serial port 316 connected to the microprocessor 302. The microprocessor 302 uses the serial port 316 as an interface for connecting the telephone remote-control mainframe 10 to learn a remote-control serial code therein and simultaneously to match and learn with the second address setter 310.

Figure 4:
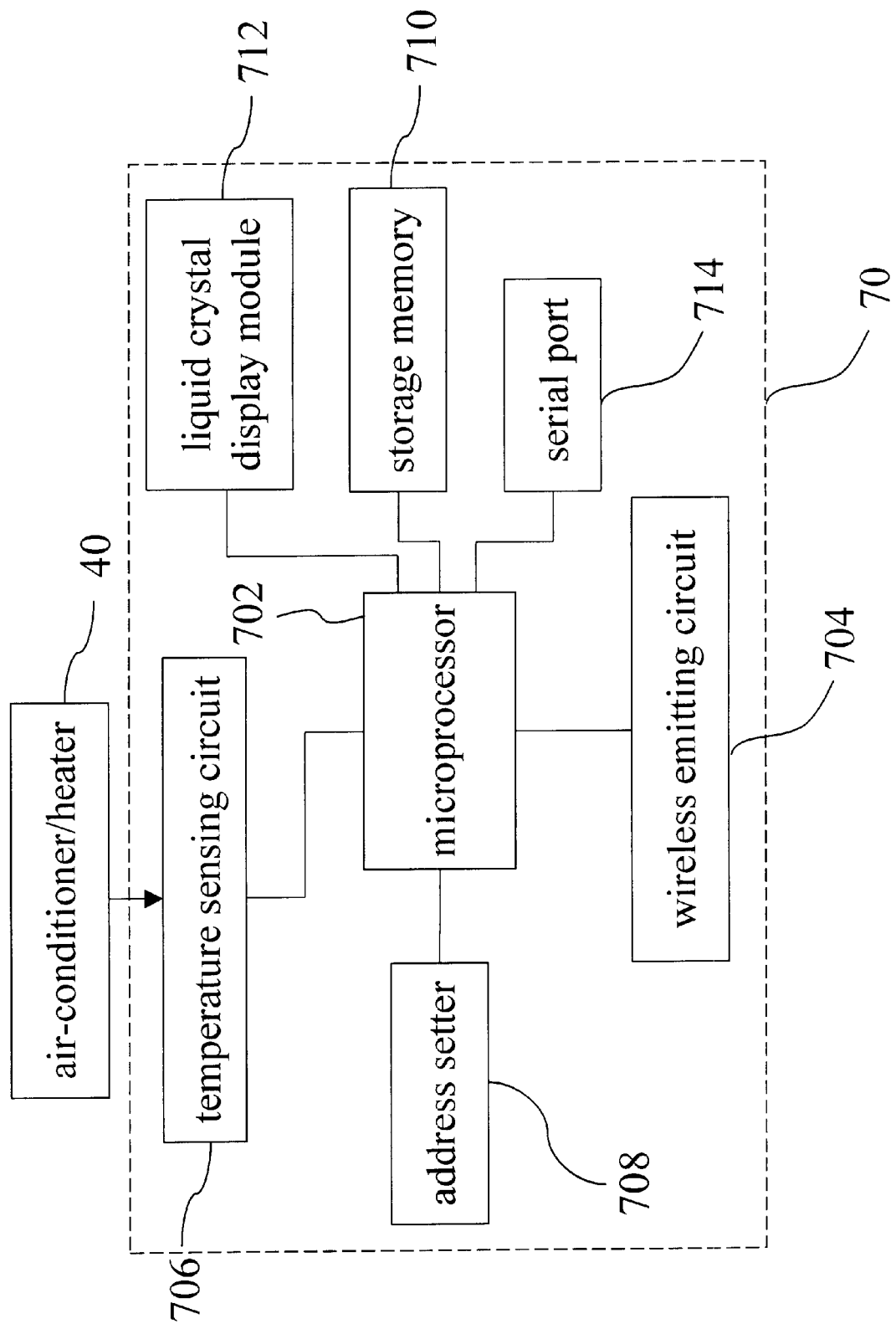
FIG. 4 is a structure diagram of a sensing-signal emitter of an air-conditioner/heater of the present invention.

When the air-conditioner/heater 40 receives an infrared remote-control signal emitted by the signal converter 30 to activate the switch of the air-conditioner/heater 40, the sensing-signal emitter is used to sense the air-conditioner/heater 40 and correspond accordingly. As shown in FIG. 4, the sensing-signal emitter 70 comprises a microprocessor 702 connected with a wireless emitting circuit 704, a temperature sensing circuit 706, an address setter 708, a storage memory 710, a liquid crystal display module 712, and a serial port 714. The microprocessor 702 utilizes the address setter 708 to learn the address serial code of the air-conditioner/heater 40, display it on the liquid crystal display module 712 simultaneously, and store the data into the storage memory 710. When the air-conditioner/heater 40 receives the infrared remote-control signal and is activated, the temperature sensing circuit 706 will sense there is continual variation of temperature due to cool air or hot air blown out. At this time, the microprocessor 702 is informed to emit a sensing signal via the wireless emitting circuit 704 to the telephone remote-control mainframe 10. The wireless receiver 106 will receive the signal, and the main-control microprocessor 102 will be used to inform a distant user via the voice device 114 that the air-conditioner/heater 40 has started operating.

Figure 5:
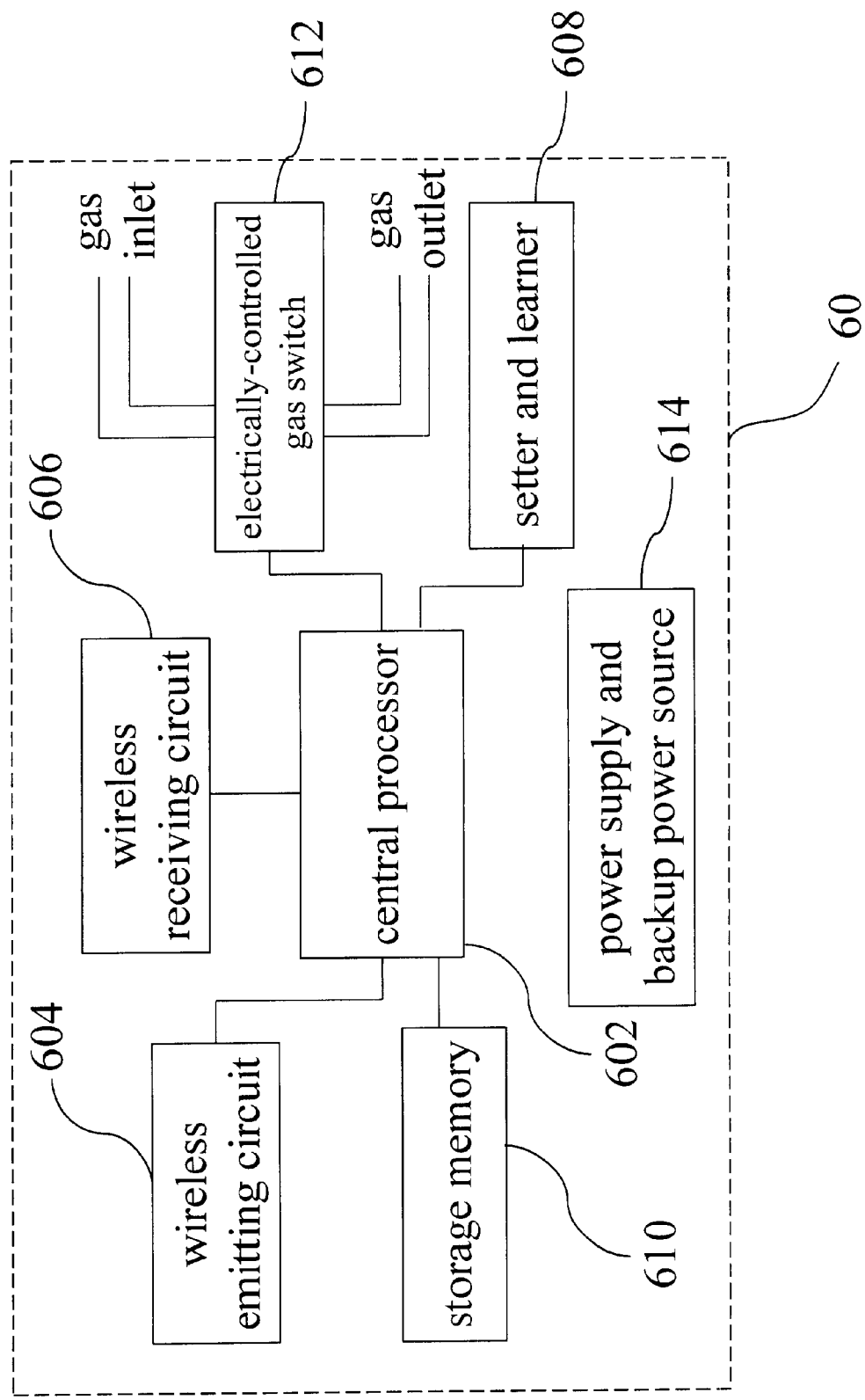
FIG. 5 is a structure diagram of a special controller of a gas oven of the present invention.

On the other hand, a switch of the wireless remote-control gas oven 50 is controlled using the special controller 60. As shown in FIG. 5, the special controller 60 comprises a central processor 602 connected with a wireless emitting circuit 604, a wireless receiving circuit 606, a setter and learner 608, a storage memory 610, and an electrically controlled gas switch 612. The electrically controlled gas switch 612 is situated at a gas gateway of the gas oven 50. The central processor 602 utilizes the setter and learner 608 to learn the address serial code of the gas oven 50, and store it into the storage memory 610. After the wireless receiving circuit 606 directly receives the control signal of the signal converter 30, it transfers the signal to the central processor 602 to close the electrically controlled gas switch 612. After finishing this procedure, the wireless emitting circuit 604 is used to emit an acknowledge signal to the telephone remote-control mainframe 10 to inform a distant user that the gas oven 50 has been closed. The special controller 60 also comprises a power supply and backup power source 614, which can provide electricity for temporary normal operation of the special controller 60 when a blackout occurs in addition to providing a DC power source in ordinary time.

Therefore, the present invention proposes a distant remote-control device of electric appliance utilizing the characteristic of infrared remote-control signals capable of learning mutually to directly learn remote-control signals of electric appliances, thereby achieving remote control of electric appliances using a telephone without attaching electric wires on electric appliances or modifying internal circuits thereof. Moreover, the present invention has the advantages of simple operation and convenient use.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A distant remote-control device of electric appliance utilizing a telephone to remotely control electric appliances, each of said electric appliances having a corresponding address serial code, said distant remote-control device of electric appliance comprising:

a telephone remote-control mainframe comprising a main-control microprocessor connected with a wireless emitter, a wireless receiver, a first address setter, and a first storage memory, said main-control microprocessor receiving an address serial code inputted by said first address setter, displaying it on a display, and storing it into said first storage memory, said main-control microprocessor being connected to a telephone signal adapting circuit, said telephone signal adapting circuit being used to receive a telephone signal of a telephone circuit and transfer it to said main-control microprocessor, which then sends out a control signal to be emitted out via said wireless emitter; and a signal converter comprising a microprocessor connected with a wireless receiving circuit, an infrared receiving circuit, an infrared emitting circuit, a second address setter, a second storage memory, and a display module, said microprocessor utilizing said infrared receiving circuit to receive a remote-control signal of said electric appliance and utilizing said second address setter to learn a corresponding address serial code of said electric appliance, display said address serial code on said display module, and store said address serial code into said second storage memory, said wireless receiving circuit receiving said control signal, said microprocessor being used to convert said control signal into an infrared remote-control signal to be emitted out via said infrared emitting circuit, thereby remotely controlling said electric appliance.

2. The distant remote-control device of electric appliance as claimed in claim 1, wherein said main-control microprocessor further comprises an I/O expansion circuit for providing sufficient I/O contacts.

3. The distant remote-control device of electric appliance as claimed in claim 1, wherein said telephone remote-control mainframe further has a serial port for connecting an external digital system.

4. The distant remote-control device of electric appliance as claimed in claim 1, wherein said telephone remote-control mainframe further comprises a backup DC power supply.

5. The distant remote-control device of electric appliance as claimed in claim 1, wherein said telephone remote-control mainframe further comprises a telephone tone discriminating circuit connected to said telephone signal adapting circuit and said microprocessor.

6. The distant remote-control device of electric appliance as claimed in claim 1, wherein said telephone remote-control mainframe further comprises a voice device connected to said microprocessor and said telephone signal adapting circuit to provide voice indication for a user.

7. The distant remote-control device of electric appliance as claimed in claim 6, wherein said voice device comprises a voice-generating device and a voice playing device.

8. The distant remote-control device of electric appliance as claimed in claim 1, wherein said first storage memory and said second storage memory are flash memories.

9. The distant remote-control device of electric appliance as claimed in claim 1, wherein said signal converter further comprises a serial port connected to said telephone remote-control mainframe to learn remote-control address serial codes therein.

10. The distant remote-control device of electric appliance as claimed in claim 1, wherein said display and said display module are liquid crystal displays.

11. The distant remote-control device of electric appliance as claimed in claim 1, wherein said electric appliance is an air-conditioner/heater or a gas oven.

12. The distant remote-control device of electric appliance as claimed in claim 11, wherein an infrared remote-control signal emitted by said signal converter is received to control a switch of said air-conditioner/heater, said air-conditioner/heater also having a sensing-signal emitter, which emits a sensing signal to said telephone remote-control mainframe to inform a distant user that said air-conditioner/heater has started operating.

13. The distant remote-control device of electric appliance as claimed in claim 12, wherein said sensing-signal emitter comprises a microprocessor connected with a wireless emitting circuit, a temperature sensing circuit, an address setter, a storage memory, and a display module, said microprocessor utilizing said address setter to learn an address serial code of said air-conditioner/heater, display said address serial code on said display module, and store said address serial code into said storage memory, said temperature sensing circuit informing said microprocessor to emit a sensing signal to said telephone remote-control mainframe via said wireless emitting circuit when said temperature sensing circuit senses there is variation of temperature.

14. The distant remote-control device of electric appliance as claimed in claim 13, wherein said sensing-signal emitter further comprises a serial port connected to said microprocessor.

15. The distant remote-control device of electric appliance as claimed in claim 11, wherein said gas oven has a special controller for directly receiving a control signal emitted by said telephone remote-control mainframe to control a switch of a gas gateway of said gas oven.

16. The distant remote-control device of electric appliance as claimed in claim 15, wherein said special controller comprises a central processor connected with a wireless emitting circuit, a wireless receiving circuit, a setter and learner, a storage memory, and an electrically controlled gas switch, said electrically controlled gas switch being situated at said gas gateway of said gas oven, said central processor utilizing said setter and learner to learn an address serial code of said gas oven and store said address serial code into said storage memory, said wireless receiving circuit transferring a control signal of said signal converter to said central processor to close said electrically controlled gas switch after receiving said control signal, said special controller emitting out an acknowledge signal to said telephone remote-control mainframe via said wireless emitting circuit.

17. The distant remote-control device of electric appliance as claimed in claim 16, wherein said special controller further comprises a backup DC power supply.

* * * * *